No. 703,697. Patented July 1, 1902.
E. EINFELDT.
METAL WHEEL.
(Application filed Dec. 3, 1901.)
(No Model.)

Witnesses
F. A. Elmore
N. R. Kenney

Inventor
Emil Einfeldt
B. P. T. Dodge
Attorney

THE NORRIS PETERS CO., PHOTO-LITHO., WASHINGTON, D. C.

UNITED STATES PATENT OFFICE.

EMIL EINFELDT, OF DAVENPORT, IOWA, ASSIGNOR TO THE BETTENDORF METAL WHEEL COMPANY, A CORPORATION OF IOWA.

METAL WHEEL.

SPECIFICATION forming part of Letters Patent No. 703,697, dated July 1, 1902.

Application filed December 3, 1901. Serial No. 84,549. (No model.)

*To all whom it may concern:*

Be it known that I, EMIL EINFELDT, of Davenport, county of Scott, and State of Iowa, have invented a new and useful Improvement in Metal Wheels, of which the following is a specification.

This invention has reference to metal wheels, and relates more particularly to that type of wheel in which the spokes are fastened to the hub and rim by integral shoulders or heads on the spokes. In all wheels of this character, as far as I am aware, the internal structure of the spoke where the shoulder is formed differs from that of the remaining portion of the spoke by reason of the fact that the shoulders are formed by upsetting the spoke endwise, which action compresses and condenses the spoke throughout its thickness, causing it to bulge or project at such points, which bulging portions constitute the shoulders.

This invention consists of a wheel in which the spoke has its outer material at a point between the hub and rim in the form of a shoulder in forcible engagement with the adjacent member of the wheel and in which the internal material of the spoke at the point where the shoulder projects is of the same general structure as the rest of the spoke, being free from any compressed or condensed portion.

The invention consists also in the details of construction and combination of parts hereinafter described and claimed.

Figure 1:
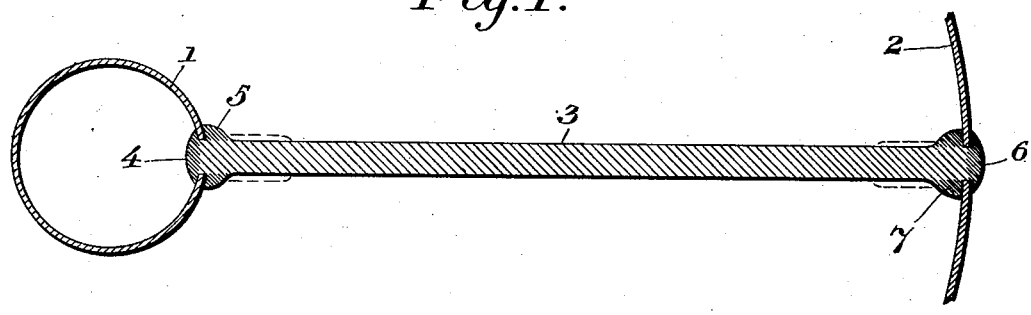
Figure 2:
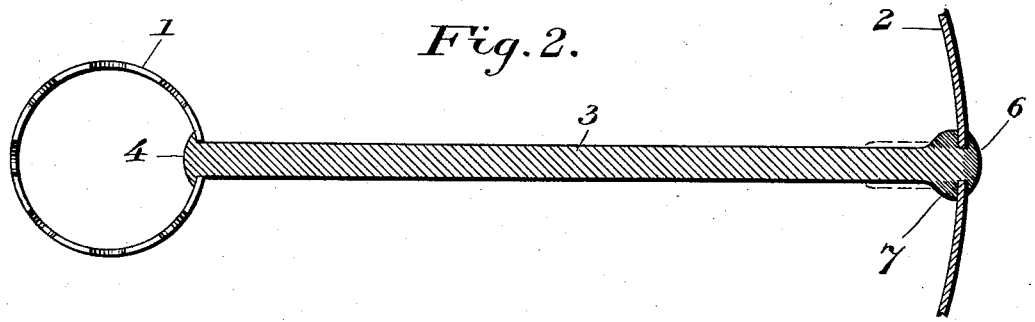

In the accompanying drawings, Figure 1 is a sectional view through a part of a wheel constructed in accordance with my invention. Fig. 2 is a similar view of a modified form of the same.

Referring to the drawings, 1 represents a hub, 2 a rim, and 3 spokes radiating from the hub and connected at their outer ends with the rim. The connection of the spokes with the hub is effected by a head 4 on the inner end of the spoke and a shoulder 5 on the spoke at the outer side of the hub, which latter is embraced firmly between the head and shoulder. The connection of the spoke with the rim is effected by means of a head 6 on the outer end of the spoke and a shoulder 7 on the spoke, near its end, between which head and shoulder the rim is firmly held.

Referring particularly to Fig. 1, which represents the preferred embodiment of my invention, the shoulders 5 and 7 consist of the outer material of the spoke, which is scraped and piled up forcibly against the hub and rim, the internal structure of the spoke at these points being undisturbed and the same as that of the main body of the spoke, as indicated by the section-lining.

In Fig. 2 I have represented a modification of my invention. Here the spoke has but one shoulder, which is in forcible contact with the adjacent member of the rim—viz., a shoulder 10, which is composed of the outer material of the spoke and which is jammed up against the rim, with no change of the internal structure of the spoke at this point. At its inner end the spoke is provided with a head which is engaged within the hub through an open slot therein.

The shoulders 5 and 7 at the outer side of the hub and the inner side of the rim, respectively, consist of an accumulation or pile of the outer material only of the spoke, and in their formation the outer material of the spoke for some distance inward of the adjacent member of the wheel is literally scraped up, preferably by means of two die-jaws, which grasp the spoke between them and are moved together relatively to the spoke longitudinally thereof, and in so doing positively displace the outer skin of the spoke, which accumulating as the die advances forms a homogeneous solid shoulder or pile. The pressure of the die on the spoke is not sufficient to upset the same in the sense of imparting to the spoke throughout its thickness an endwise movement; but the pressure is sufficient only to displace the outer skin of the spoke to such a depth that the material displaced will in its accumulated state form a distinct shoulder.

While it is preferable to previously provide the spoke where the shoulder is to be scraped up with a lengthy, enlarged, or thickened portion, as shown, so that when this thickened portion is scraped and piled up the diameter of the spoke will not be reduced and result in a weakening, this is not absolutely necessary, for the spoke before being acted on may be of the same diameter throughout, for the reason that the amount of material which it is necessary to displace to form the shoulder will not be such as to reduce the diameter of the spoke to an injurious or dangerous extent. It is seen, therefore, that by reason of the peculiar structural formation of the scraped-up shoulder the internal material of the spoke is absolutely undisturbed. Consequently its internal structure between the rim and the hub is uniform and the same. Whatever molecular change takes place is confined to the displaced outer skin of the spoke and does not extend below or inward of this displaced portion.

I believe myself to be the first, therefore, to form a confining-shoulder on a spoke by positively and literally scraping up and accumulating in a pile the outer material or skin only of the spoke and disposing the same into forcible engagement with the adjacent member of the wheel.

Among the advantages of a wheel embodying my invention are uniformity of tension and length of the spokes, for by reason of the form of the shoulders there is no shortening of the spoke in fastening the same in place, as the internal structure where the shoulders are formed is not disturbed, but is the same as that of the rest of the spoke.

Having thus described my invention, what I claim is—

1. In a metal wheel a spoke having at a point between the hub and rim, a shoulder in forcible engagement with the adjacent member of the wheel, which shoulder consists of a piled-up accumulation of the outer material only of the spoke.

2. In a metal wheel the combination with the rim and hub, of a spoke having its ends provided with heads at the outer side of the rim and inner side of the hub respectively, and having at the outer side of the hub a shoulder in forcible engagement with the hub, which shoulder consists of a piled-up accumulation of the outer material only of the spoke, and a shoulder on the spoke at the inner side of the rim.

In testimony whereof I hereunto set my hand, this 26th day of October, 1901, in the presence of two attesting witnesses.

EMIL EINFELDT.

Witnesses:
NATH FRENCH,
MAY L. DODGE.